G. F. REINHARDT.
Drum and Oven.
No. 92,543.
Patented July 13, 1869.
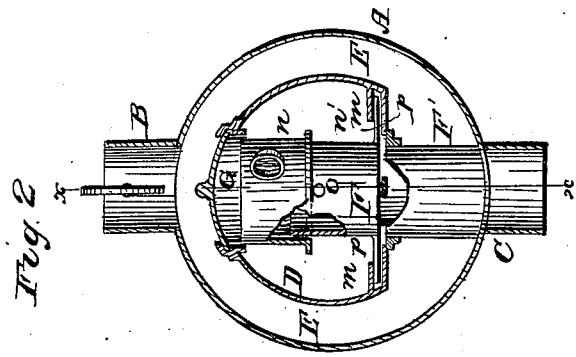
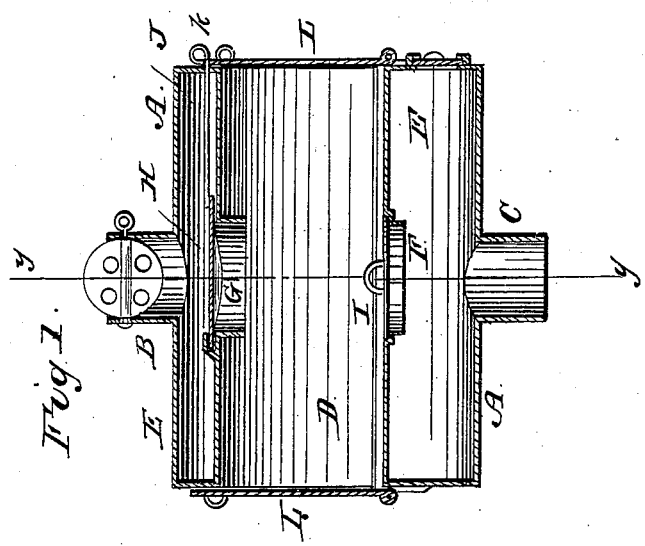
WITNESSES
INVENTOR

United States Patent Office.

GEORGE F. REINHARDT, OF LINCOLN, ILLINOIS.

Letters Patent No. 92,543, dated July 13, 1869.

---

COMBINED DRUM AND OVEN.

---

The Schedule referred to in these Letters Patent and making part of the same.

---

*To all whom it may concern:*

Be it known that I, GEORGE F. REINHARDT, of Lincoln, in the county of Logan, and State of Illinois, have invented a new and useful Improvement in Baking-Drums; and I do hereby declare that the following is a full, clear, and exact description thereof, which will enable others skilled in the art to make and use the same, reference being had to the accompanying drawings, forming part of this specification.

This invention relates to a combined baking and heating drum for stove-pipes or pipe-flues, through which a current of heated air or gas is passed, and consists in the construction and arrangement of parts as hereinafter described.

In the accompanying plate of drawings—

Figure 1 represents a vertical longitudinal section of the oven, through the line $x\ x$ of fig. 2, showing the drum as prepared for baking.

Figure 2 is a vertical cross-section through the line $y\ y$ of fig. 1.

Similar letters of reference indicate corresponding parts.

This drum is designed to be placed in a stove-pipe, and serve as a length of pipe.

A is the outer, or radiating drum, which is cylindrical in form, placed in a horizontal position in the pipe, and of suitable length and diameter to adapt it to baking, as well as heating-purposes.

Its connection with the pipe is made by the short sections B C, on the top and bottom of the drum B, having a damper arranged in it, as seen in the drawing.

D is the oven, with a flat bottom, and corresponds in length with the outer drum.

E represents the annular space between the oven and the drum.

F is an orifice through the bottom of the oven, and G is an orifice through its top.

When the oven is used for baking, F is closed by the cover I, and G is closed by a slide, H, which is operated by the rod J, from the outer end, as seen at K.

L L represent doors, which close the oven at each end.

M M represent flanges on the inside of the oven, for supporting a grate or slide for the baking-dishes.

In fig. 2, the drum is seen, arranged so that the smoke and heated products of combustion are allowed to pass directly through the oven. This is accomplished by putting an open-flanged pipe, F', in place of the cover I, at F, in the bottom of the oven, which passes down through the annular space E, and is made to support the short sections of pipe N N, which slip together, as seen in the drawing.

O is a pin on the part N', upon which the part N rests when the parts are in place, as seen in the drawing.

The lower part N' has projecting flanges $p$ on each side, which slip under the flanges M M when it is placed in position, as seen in the drawing.

When the two parts are placed in the oven, over the lower orifice F, the upper one is slipped up into the flange of the upper orifice G, so as to make a tight joint and a perfect flue for the passage of all the smoke and products of combustion through the oven. The sliding plate H is, of course, withdrawn in this arrangement.

The advantages to be derived from this combined oven and heating-drum are many, and must be obvious to all.

Having thus described my invention,

I claim as new, and desire to secure by Letters Patent—

1. In combination with a heating-drum, the oven D, constructed with the apertures F and G, substantially as shown and described.

2. Passing the smoke and products of combustion through the oven, substantially as described.

3. The arrangement of the pipes F', N, and N', in combination with a combined oven and heating-drum, substantially as set forth.

GEORGE F. REINHARDT.

Witnesses:
WM. B. JONES,
T. B. HUFFMAN.